(12) United States Patent
Lynch et al.

(10) Patent No.: US 9,348,345 B2
(45) Date of Patent: May 24, 2016

(54) FIXED FREQUENCY DC TO DC CONVERTER CONTROL CIRCUIT WITH IMPROVED LOAD TRANSIENT RESPONSE

(71) Applicant: Texas Instruments Incorporated, Dallas, TX (US)

(72) Inventors: Brian Thomas Lynch, Brookline, NH (US); Neeraj Keskar, Merrimack, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 245 days.

(21) Appl. No.: 13/947,140

(22) Filed: Jul. 22, 2013

(65) Prior Publication Data

US 2014/0070784 A1      Mar. 13, 2014

Related U.S. Application Data

(60) Provisional application No. 61/700,176, filed on Sep. 12, 2012.

(51) Int. Cl.
*G05F 1/46* (2006.01)
*H02M 3/156* (2006.01)

(52) U.S. Cl.
CPC .............. *G05F 1/46* (2013.01); *H02M 3/156* (2013.01); *H02M 2003/1566* (2013.01)

(58) Field of Classification Search
CPC ......... G05F 1/46; H02M 3/156; H02M 3/157; H02M 3/158; H02M 2001/0019; H02M 2001/0025
USPC .................................. 323/222, 271, 282–288
See application file for complete search history.

(56) References Cited

U.S. PATENT DOCUMENTS

| | | | |
|---|---|---|---|
| 6,861,826 B2 | 3/2005 | Lynch | |
| 7,245,113 B2 | 7/2007 | Chen et al. | |
| 7,518,885 B2 | 4/2009 | Baurie et al. | |
| 7,701,190 B2 * | 4/2010 | Chen et al. | 323/288 |
| 7,868,600 B2 * | 1/2011 | Qiu et al. | 323/282 |
| 7,902,807 B2 | 3/2011 | Keskar et al. | |
| 7,923,977 B2 * | 4/2011 | Huang | 323/271 |
| 8,030,909 B2 | 10/2011 | Ma et al. | |
| 8,115,523 B2 | 2/2012 | Lynch | |
| 8,217,636 B2 | 7/2012 | Khayat et al. | |
| 8,330,437 B1 * | 12/2012 | Hartman | 323/271 |
| 8,330,442 B2 * | 12/2012 | Han et al. | 323/282 |
| 2008/0106917 A1 * | 5/2008 | Holt | 363/26 |
| 2008/0164853 A1 | 7/2008 | Hack et al. | |
| 2009/0153124 A1 | 6/2009 | Ishii | |
| 2009/0200995 A1 | 8/2009 | Tran et al. | |

OTHER PUBLICATIONS

Enhanced, Low-Input Voltage-Mode Synchronous Buck Controller, TPS40020, TPS40021, product information, Texas Instruments Incorporated, SLUS535D—Mar. 2003, Revised Jul. 2007.

* cited by examiner

*Primary Examiner* — Timothy J Dole
*Assistant Examiner* — Htet Z Kyaw
(74) *Attorney, Agent, or Firm* — William B. Kempler; Frank D. Cimino

(57) ABSTRACT

Analog pulse width modulation (PWM) control circuits and techniques are presented for improving output voltage load transient response in controlling DC to DC conversion systems in which a transient detector circuit restarts a PWM carrier ramp waveform to initiate asynchronous injection of a pulse between the regular periodic PWM pulses in a fixed frequency pulse stream to mitigate the effect of output inductor energy depletion on output voltage.

18 Claims, 9 Drawing Sheets

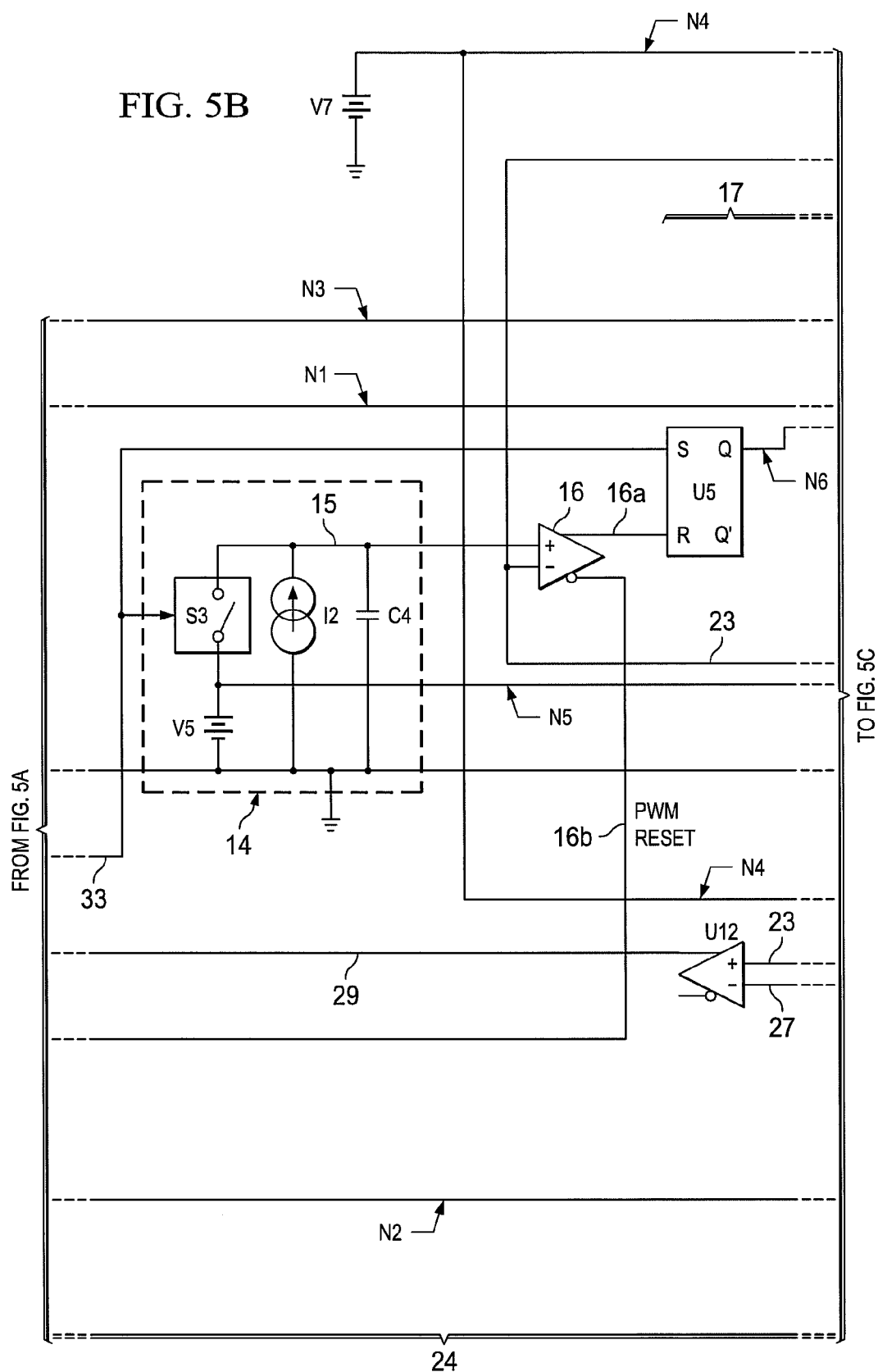

US 9,348,345 B2

FIXED FREQUENCY DC TO DC CONVERTER CONTROL CIRCUIT WITH IMPROVED LOAD TRANSIENT RESPONSE

REFERENCE TO RELATED APPLICATION

This application claims priority to and the benefit of U.S. Provisional Patent Application Ser. No. 61/700,176 that was filed on Sep. 12, 2012 and is entitled CIRCUIT TO IMPROVE OUTPUT VOLTAGE LOAD TRANSIENT RESPONSE IN A FIXED FREQUENCY DC TO DC CONVERTER, the entirety of which is incorporated by reference herein.

FIELD OF THE INVENTION

The present disclosure relates to control of DC to DC converters and more particularly to fixed frequency PWM control circuitry for controlling a DC to DC conversion system.

BACKGROUND

Power supplies for modern electronic circuits are typically required to provide stable regulated supply voltages for proper operation of processors, ASICS, memory, and other components. Computers, smart phones, tablets, and other electronic products typically employ DC to DC converters to provide supply voltages for operation of the internal circuitry. During operation, however, the current required to operate various circuit components changes, and a power supply may need to regulate the supply voltage within a narrow tolerance band (e.g., +/−3% or less) even in the presence of large current draw variations over a short period of time. The variation in current draw is reflected as a load transient to the DC to DC converter that provides the supply voltage, and DC to DC converter controller performs closed loop converter operation to maintain a generally constant output voltage during these load transients.

DC to DC converters typically include one or more switching devices operated by pulse width modulated switching control signals, and a common form of pulse width modulation (PWM) employs a generally fixed switching frequency with the controller modifying the width or duration of the switching control signal pulses to regulate the output voltage according to a feedback signal to compensate for changes in the output load requirements. Fixed frequency DC to DC conversion, however, suffers from voltage regulation limitations in the presence of abrupt changes in load current. In particular, many DC to DC converter architectures employ an output inductor providing current to the load, and switching operation of the converter switch or switches selectively connects the inductor to the source of input power during the "on time" of the PWM switching signal pulses. If the load current increases quickly, particularly when the power supply switch is in an "off" state, the inductor energy may become depleted until the next switching interval. As a result, the output voltage may decrease significantly or "dip". Subsequent PWM switching pulses can replenish the inductor current, but the closed loop control in a fixed frequency control approach may not be able to prevent a significant voltage deviation in the time it takes to react, and subsequent switching operation may cause an overshoot in the output voltage as the circuit returns to regulated control. The initial voltage drop following an increase in the required load current is referred to as the load transient response of the DC to DC converter. The magnitude of the voltage dip may be addressed, to some extent, by addition of output capacitance to source the energy demanded during the load transient, but additional capacitance increases the cost and size of the power conversion system. Variable frequency PWM approaches may be adopted in order to address load transient response issues, including hysteretic constant on-time, constant off-time, and other approaches, which may in certain circumstances closely approximate fixed frequency operation, but variable frequency designs may be difficult to implement for use in systems synchronized with a system clock or in multiphase or stacked converter configurations. The use of hysteretic comparators providing a control loop outside of the fixed frequency inner loop, moreover, requires the controller to multiplex an I/O pin for monitoring the output voltage and the selection of filter components to avoid loop-to-loop oscillations is limited by the use of the comparators. Accordingly, a need remains for improved fixed frequency pulse width modulation control apparatus and techniques for improved regulation and reduced voltage dip magnitude in the presence of abrupt increases in load current requirements.

SUMMARY

The present disclosure provides improved DC to DC converter control circuitry and PWM controllers by which the above-mentioned difficulties and shortcomings can be mitigated, in which one or more pulses are asynchronously injected into the PWM signal stream in response to detection of increasing load current requirements in order to reduce the effect of depleting inductor energy on the output voltage. These techniques advantageously facilitate fixed frequency operation according to a periodic clock signal, and may be used in systems employing any suitable type of output filter configuration. Moreover, the techniques can be used in both trailing-edge and leading-edge modulation approaches for either voltage mode or current mode control loop operation. Furthermore, the asynchronous pulse induction approaches outlined herein may mitigate the need for additional output capacitance in order to control the amount of voltage dip caused by increases in the output load current.

In accordance with one or more aspects of the present disclosure, DC to DC converter control circuits are provided, including an analog carrier waveform generator and a comparison circuit or comparator which compares amplitudes of a periodic carrier signal waveform and an output error control signal and provides a pulse output signal including periodic pulses. The control circuit also includes a driver circuit which provides one or more switching control signals for DC to DC converter switch operation according to the pulse output signal, as well as an error amplifier which generates the output error control signal by comparison of an output voltage feedback signal to a reference voltage signal. An asynchronous pulse injection circuit is provided, which causes injection of one or more pulses into the pulse output signal in response to detection of an output load current transient condition. In this manner, the controller can react asynchronously to the detected load transient without having to wait for the next periodic PWM pulse. This quick reaction, moreover, advantageously allows the DC to DC converter switch to mitigate depletion of the output inductor energy and thereby reduce the amount of voltage dip resulting from the load transient.

The pulse injection circuit in certain embodiments includes an offset circuit creating an offset signal by adding an offset voltage to an average or peak of the output error control signal, and a second comparator which compares the offset signal to the original output error control signal. The second comparator provides an output at one of two levels based on whether the offset signal is greater than the output error control signal, and a reset circuit provides an output signal to initiate asynchronous injection of a pulse into the pulse output signal responsive to a transition in the second comparator output indicating the output error control signal exceeds the offset signal. In certain embodiments, the offset circuit includes a low pass filter to provide the offset signal representing the average of the output error current signal offset by the offset voltage amount. In other embodiments, the offset circuit includes a peak detector receiving the output error control signal and providing an output representing a peak voltage of the output error control signal that is offset for comparison with the unmodified output error control signal. In this manner, the offset voltage can be set such that the pulse injection circuit will not react to normal output voltage fluctuations (e.g., ripple) associated with steady state operation or small output load requirement variations, while still reacting quickly to address significant unregulated drops in the output voltage.

In certain embodiments, the carrier waveform generator circuit includes a capacitance and a current source to provide an increasing ramp signal waveform to the comparison circuit input, with a switch connected to selectively allow the current source to charge the capacitance or to fully or partially discharge the capacitance in order to reset the signal waveform. For generation of the fixed frequency pulse stream, the switch is operated by a periodic clock signal such that a new ramp signal waveform is begun at periodic intervals, and the reset circuit selectively provides an output signal to the switch to asynchronously reset the capacitor voltage such that the comparison circuit injects an additional pulse independent of the periodic clock signal in response to the detected load transient condition. In this manner, the periodic fixed frequency operation is continued with a new PWM pulse being generated during each clock period, with the pulse injection circuit operating when needed to inject one or more additional pulses between the regularly scheduled (clock-driven) PWM pulses. The control circuit may include an OR gate providing the waveform generator reset switch control signal based on inputs from the periodic clock signal and the reset circuit. In certain implementations, moreover, the comparison circuit or PWM comparator provides a complementary pulse output signal as a PWM reset pulse output to the reset circuit such that the pulse injection circuit can trigger a second or further asynchronous pulse before the next clock signal is received.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 5A-5C show a detailed schematic illustrating another exemplary DC to DC converter control circuit embodiment including a peak detect and offset circuit.

DETAILED DESCRIPTION

Figure 1:
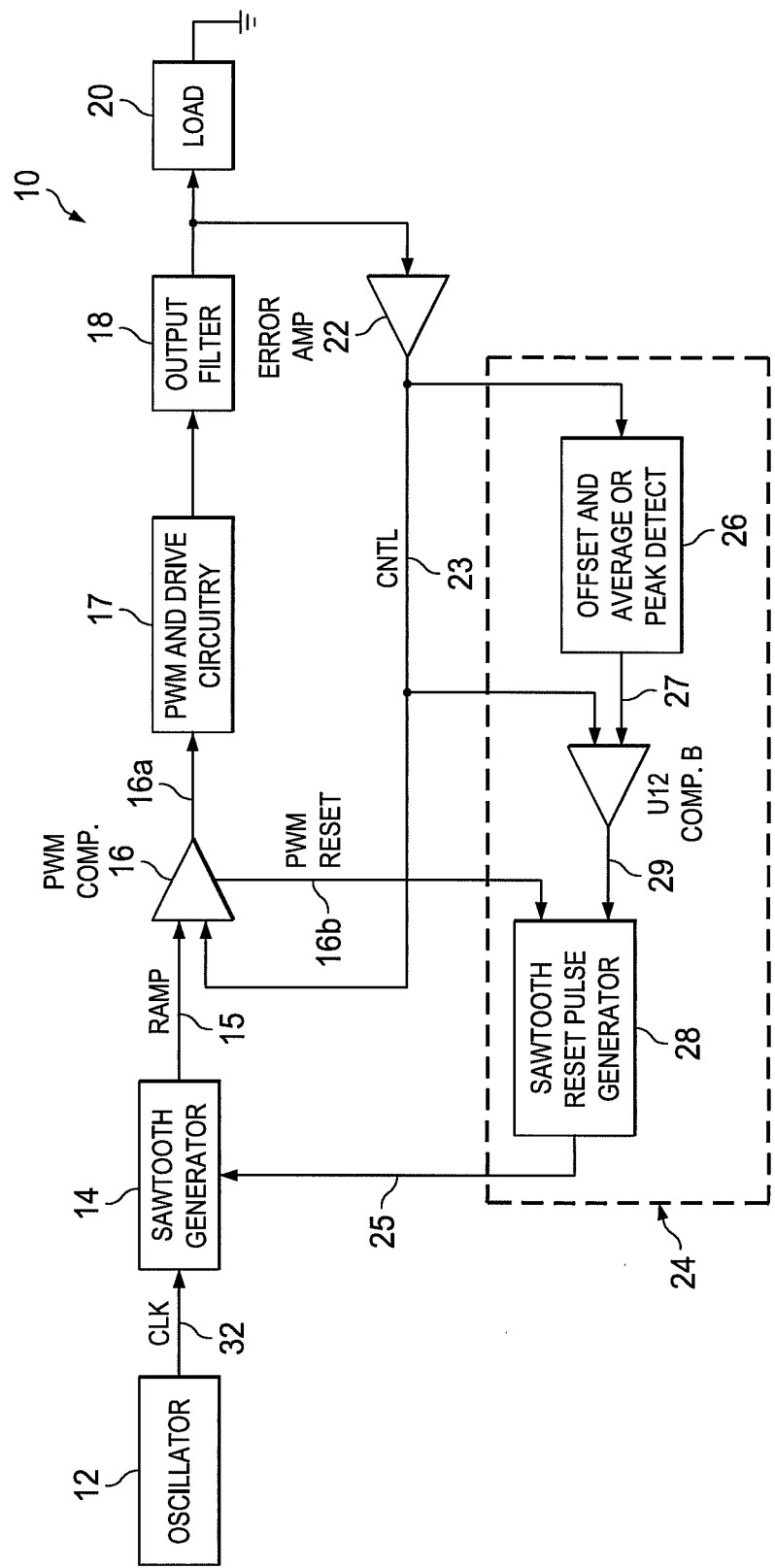
FIG. 1 is a simplified schematic diagram illustrating an exemplary fixed frequency analog DC to DC converter control circuit with an asynchronous pulse injection (API) circuit for controlling output voltage load transient response in accordance with one or more aspects of the present disclosure.

One or more embodiments or implementations are hereinafter described in conjunction with the drawings, wherein like reference numerals are used to refer to like elements throughout, and wherein the various features are not necessarily drawn to scale. The disclosure provides analog DC to DC converter control circuitry solutions addressing output voltage load transient response problems while still allowing fixed frequency PWM operation for selective introduction of additional PWM signal pulses triggered by detection of unregulated decreases in DC output voltage. As used herein, fixed frequency PWM operation means provision of periodic PWM pulses for use in generating switching control signals for one or more DC to DC converter switching devices, alone or supplemented by selective injection of one or more additional pulses in the PWM signal stream between the regularly occurring (periodic) pulses. The various concepts of the present disclosure find utility in association with any suitable form of DC to DC converter, including without limitation buck converters, boost converters, buck boost converters, cuk converters, etc. Furthermore, the disclosed circuits can be employed in implementing trailing-edge pulse width modulation in which a PWM pulse begins with a clock pulse edge and the trailing edge of the pulse is adjusted according to a feedback error signal, as well as in leading-edge PWM where the pulses end at a particular clock edge, and the pulse start time is determined according to closed loop regulation. Moreover, the PWM control circuitry described herein may be employed in single stage DC to DC converters as well as in operating multi-stage conversion systems, wherein the various aspects of the present disclosure are not limited by the illustrated and described embodiments.

Referring initially to FIGS. 1 and 2A-2C, FIG. 1 illustrates a PWM control circuit 10 for a fixed frequency pulse width modulation (PWM) DC-DC converter to provide power to drive a load 20. The PWM control circuit 10 may be used in any suitable form of fixed frequency DC-DC converter, including without limitation synchronous converters, non-synchronous converters, etc., by which an input DC signal (e.g., from an input voltage source) is converted to provide a DC output to a load 20. Moreover, the DC-DC converter may be operated in a voltage control mode and/or in a current control mode. The control circuit 10 may be provided in an integrated circuit (IC) product, which may be a PWM controller chip used to provide PWM switching control signals to one or more external power switches (e.g., MOSFETs, IGBTs, etc.), or may be a PWM converter IC including one or more internal power switches, and may further include an onboard output inductor, for example, for buck converter applications.

The control circuit 10 in FIG. 1 includes a sawtooth or ramp waveform generator circuit 14 receiving a clock output signal 32 (CLK) from an oscillator circuit 12. In certain implementations, the oscillator circuit 12 may be incorporated with the control circuit 10 in a single integrated circuit product, or the control circuit 10 may receive the clock signal 32 from an external oscillator 12 or other clock source. The waveform generator circuit 14 may provide any suitable periodic signal waveform 15 suitable for use as a carrier signal in a carrier-based analog pulse width modulation architecture, and in the illustrated embodiments provides a ramp (sawtooth) output signal waveform 15 which is compared by a PWM comparator or comparison circuit 16 (PWM COMP. in FIG. 1) with an output feedback control signal 23 (CNTL) from a compensated error amplifier circuit 22. In the illustrated embodiment, a generally increasing ramp signal 15 is provided by the sawtooth generator 14, and steady state fixed frequency operation begins each cycle with the ramp signal 15 being reset to a starting value, from which it rises. The beginning of the ramp signal 15, moreover, begins the on or active state of the corresponding PWM pulse output signal 16a, which continues in that state until the ramp signal 15 is equal to or exceeds the output voltage feedback control signal 23 (trailing edge PWM), at which point the output 16a transitions back to an off or inactive state. The PWM pulse output signal 16a is provided to a PWM and drive circuit 17 for buffering and/or suitable signal conditioning to generate a corresponding signal or signals to drive control terminals of the DC to DC converter switching devices.

Comparison of the sawtooth generator ramp output signal 15 with the control signal 23 thus provides a fixed frequency carrier-based PWM configuration which generates a comparator output signal for operation of the PWM and drive circuitry 17, which can be used to generate switching control signals for one or more converter switching devices, such as high and low drivers driven in complementary fashion (e.g., MOSFETs S1 and S4 in FIGS. 2A-2C and 5A-5C below) for a buck converter in one non-limiting example. In such a high/low drive system, the pulse width of the output of the comparator circuit 16 controls the on times of the complementary signals provided to the switching devices, and the circuitry 17 staggers the driver signals such that both devices are not on at the same time. In other possible embodiments, only a single switch may be driven by the PWM output from the drive circuitry 17, for example, with the signaling being used to control a high side driver switch and a diode is used instead of a low side driver switch (e.g., a diode is substituted for switch S4 in FIGS. 2A-2C and 5A-5C below). The output of the converter switches is provided through an optional output filter circuit 18 to drive the load 20, and the output voltage is provided as an input to a compensated error amplifier circuit 22. The error amplifier 22 generates the output error control signal 23 representing the difference between the output voltage supplied to the load 20 and a reference voltage, such as a setpoint voltage, and the control signal 23 is provided to the PWM comparison circuit 16 for comparison with the ramp carrier waveform signal 15.

In accordance with various aspects of the present disclosure, the system 10 further includes an asynchronous pulse injection (API) circuit 24 operative in response to a sensed output load transient to asynchronously inject at least one pulse into the otherwise fixed frequency pulse stream 16a provided by operation of the sawtooth generator 14 and the PWM comparator circuit 16. In certain complementary output systems, the API circuit 24 may be used to selectively modify the pulse stream provided only to the high side driver, although not a strict limitation of all possible embodiments of the present disclosure. As shown in FIG. 1, the API circuit 24 includes an optional offset and average or peak detector circuit 26, as well as a second comparator circuit U12 (COMP. B), each receiving the output voltage feedback control signal 23 from the error amplifier circuit 22, with the offset circuit 26 providing an offset signal 27 as an input signal to the comparator circuit U12. The offset signal 27 in certain embodiments (e.g., FIGS. 2A-2C) represents an average of the feedback control signal 23, suitably offset, such as generated using low pass filtering components and an offset current source in the circuit 26. In other possible embodiments (e.g., FIGS. 5A-5C below), the offset signal 27 is generated using a peak detector circuit (e.g., peak and hold circuit) to represent a most recent peak value of the feedback control signal 23, offset by a predetermined amount. In such embodiments, for instance, the circuit 26 detects the peak amplitude of the steady state output voltage feedback control signal 23, and offsets that by a predetermined amount to generate the offset signal 27.

Figure 3:
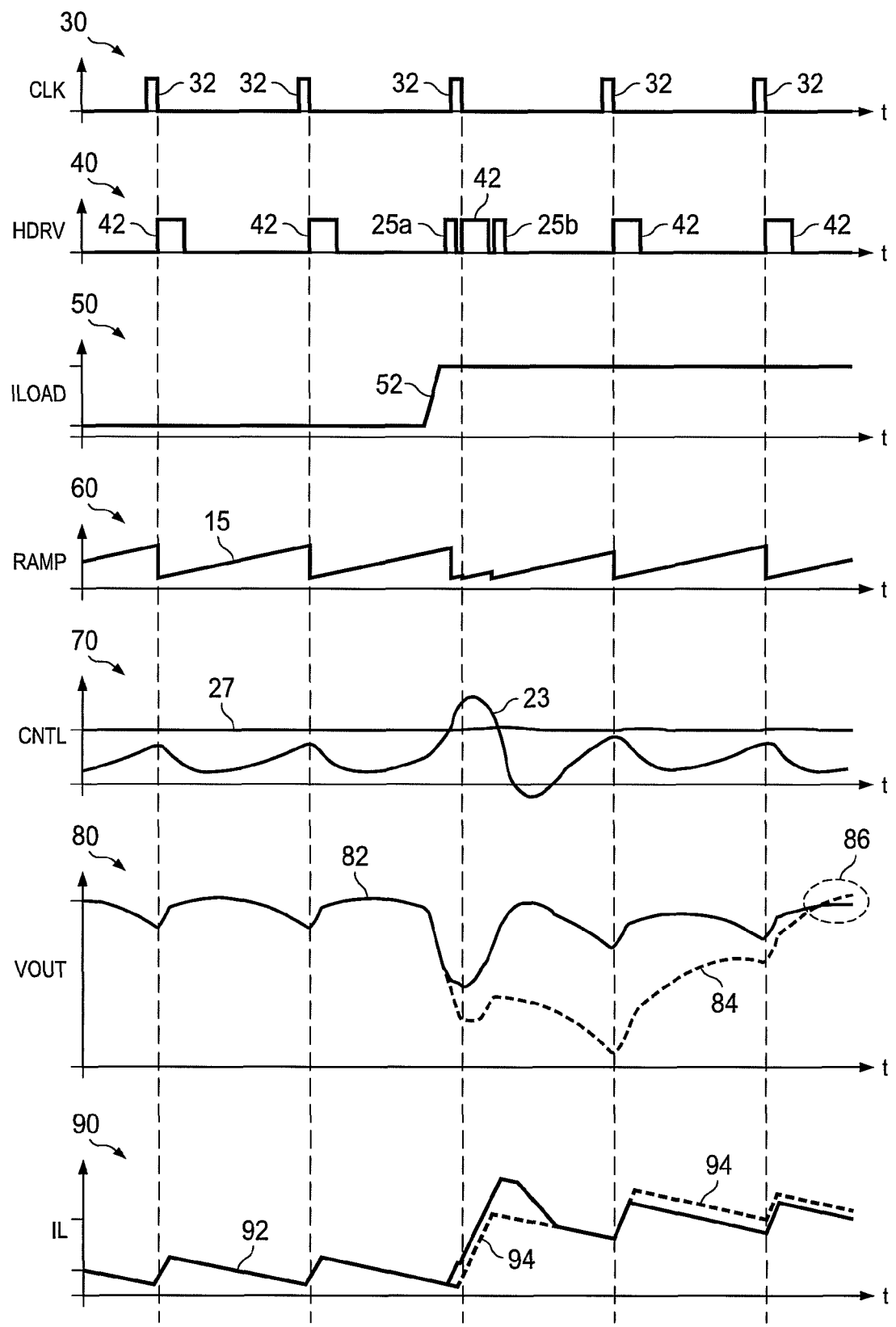
FIG. 3 is a graph illustrating various pulse signals and other waveforms in the control circuit of FIG. 2.

The feedback control signal 23 is compared with the offset signal 27 to generate a comparator output signal 29 that is used by a sawtooth reset pulse generator circuit 28 to selectively restart the ramp signal 15 provided by the sawtooth generator circuit 14. In this manner, when the feedback control signal 23 from the error amplifier circuit 22 deviates from the average or peak value by the offset amount, the API circuit 24 starts a new cycle of the ramp signal 15, thereby injecting a pulse into the PWM pulse stream 16a provided by the PWM comparator circuit 16. In addition, the control signal 23 in such situations will have a voltage amplitude that will control the width of the asynchronously injected pulse, in order to at least partially counteract a corresponding dip in the output voltage provided to the load, thereby facilitating output voltage regulation independent of the condition or state of the clock signal 32. Once the injected pulse is completed, the PWM comparator circuit 16 provides a PWM reset signal 16b to the sawtooth reset pulse generator circuit 28 to enable the circuit 28 to generate a further asynchronous pulse, if still required. In the illustrated examples, moreover, the PWM reset signal 16b allows the regularly scheduled PWM pulses triggered by the oscillator circuit 12 to occur at the fixed operating frequency, regardless of whether the API circuit 24 is attempting to insert an asynchronous pulse, whereby the circuit 10 maintains fixed frequency PWM operation. For example, a somewhat lengthy output voltage dip may extend both before and after a regularly scheduled (fixed frequency) PWM pulse according to the oscillator circuit 12, with the PWM reset signal 16b causing the regularly scheduled PWM pulse to be initiated in accordance with the oscillator clock signal, with the potential for asynchronous pulses being inserted both before and after the regularly scheduled pulse, as seen in the example of FIG. 3 below. In this regard, various implementations are possible in which the API circuit 24 is configured to selectively provide at least one additional pulse in a given oscillator clock period, and certain embodiments may allow more than one API pulse to be provided in a given oscillator clock period.

Operation of the API circuit 24, moreover, is independent of the oscillator circuit 12, whereby the normal fixed frequency pulse stream continues, and the next occurrence of an oscillator clock pulse will trigger the next regularly scheduled PWM pulse in addition to any injected pulse caused by operation of the API circuit 24. In addition, the offsetting provided by the circuit 26 is preferably set such that the API circuit 24 will reset the sawtooth generator 14 only when the feedback control signal 23 has undergone an excursion of a predetermined amount indicating a voltage dip in the output. In certain embodiments, for instance, the offsetting provided by the circuitry 26 is such that the API circuit 24 will not inject an asynchronous pulse unless a decreasing output voltage excursion exceeds normal or expected output voltage ripple levels. In this regard, various implementations can be tailored to selectively avoid false triggering based on normally expected output ripple voltage excursions and any associated sources of noise in the circuit 10, while responding quickly to significant output voltage dips in a timely fashion to mitigate the amount of output voltage drop in response to increasing load current transitions.

By this operation, the API circuitry 24 advantageously utilizes the output of the compensated error amplifier 22 for detection of increasing load current transient conditions, without need for a separate integrated circuit pin to monitor output voltage, and the width of the asynchronously injected pulse is controlled to limit the energy delivered to the power converter output inductor thus limiting the amount of current overshoot. Moreover, the addition of the API circuit 24 may be employed in control circuits used in single or multiphase (e.g., stacked) DC-DC conversion architectures. Furthermore, the injected pulse is inserted into the regularly scheduled fixed frequency PWM pulse stream in response to detection of the output load transient, thereby mitigating latency and ultimately reducing the amount of voltage dip resulting from such transient conditions. This operation, moreover, may facilitate potential reduction in the output capacitance requirement of a given DC-DC converter design, thereby reducing system costs and space requirements.

Figure 4:
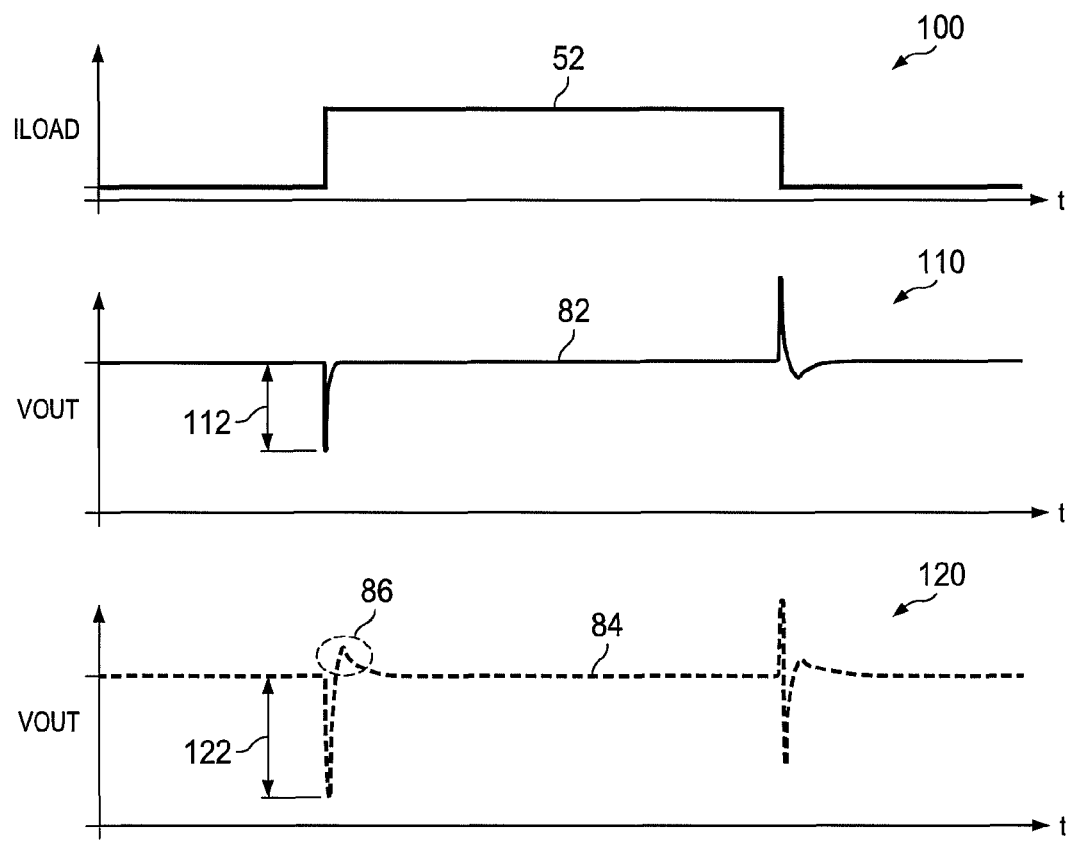
FIG. 4 is a graph illustrating graphs showing load current transitions and corresponding output voltages for the DC to DC converter control circuit of FIG. 2 and for a DC to DC converter without the asynchronous pulse injection circuitry.

Referring also to FIGS. 2A-4, FIGS. 2A-2C illustrate further details of an exemplary embodiment of a fixed frequency DC-DC converter control circuit 10, and FIGS. 3 and 4 illustrate exemplary waveforms and signals in the circuit 10 for situations involving increasing load current transients. In this embodiment, the pulse width modulation technique involves trailing-edge modulation, but other embodiments are possible using leading-edge modulation circuitry. In addition, the illustrated embodiments provide overall output voltage regulation using a compensated error amplifier circuit 22 providing a voltage output feedback control signal 23, although other embodiments are possible in which the overall control loop or regulation loop implements a current regulation approach.

Figure 2A:
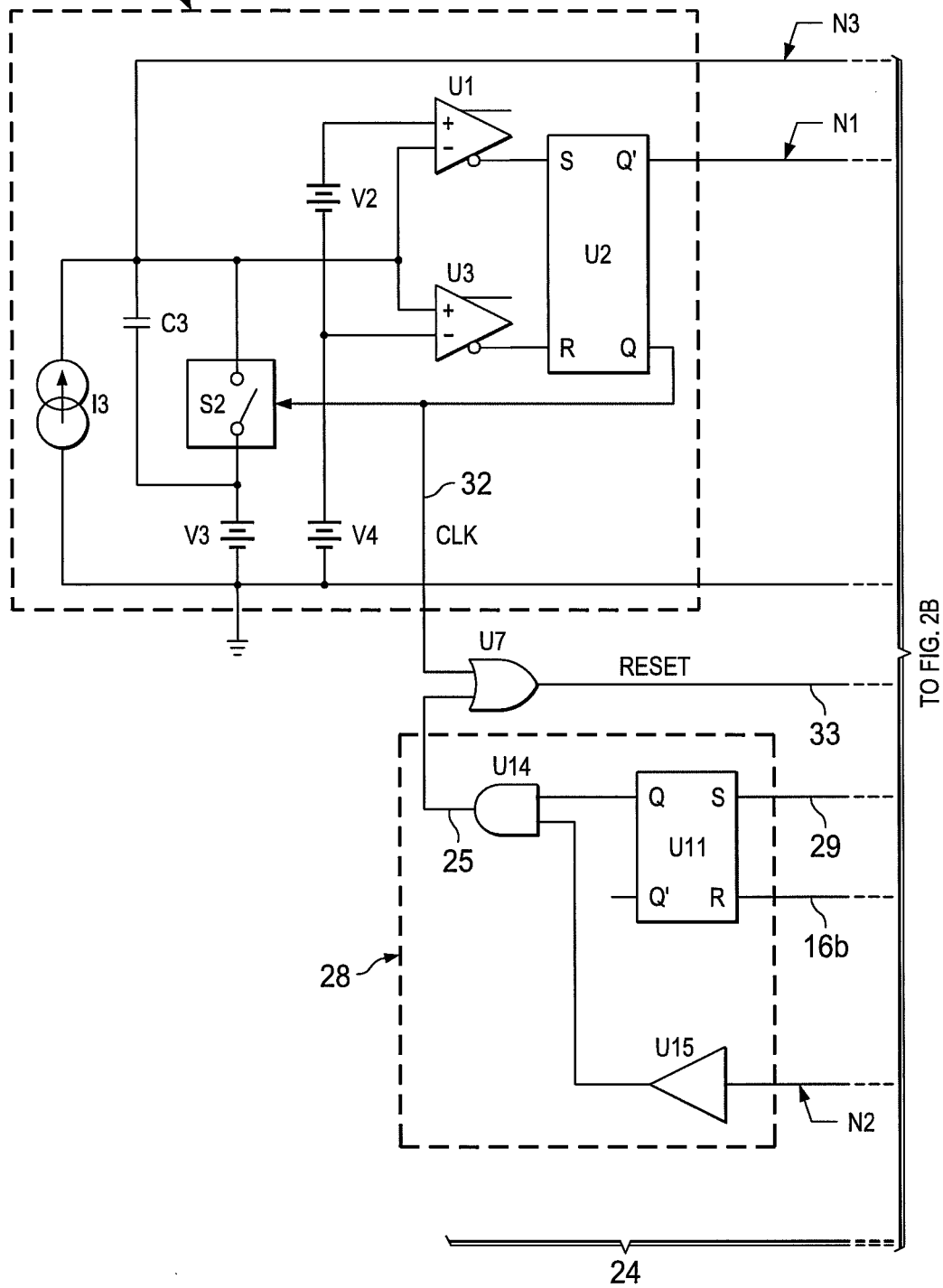
FIGS. 2A-2C illustrate a detailed schematic showing an exemplary embodiment of the DC to DC converter control circuit having an averaging and offset circuit for detecting increasing output load current transient conditions.
Figure 2B:
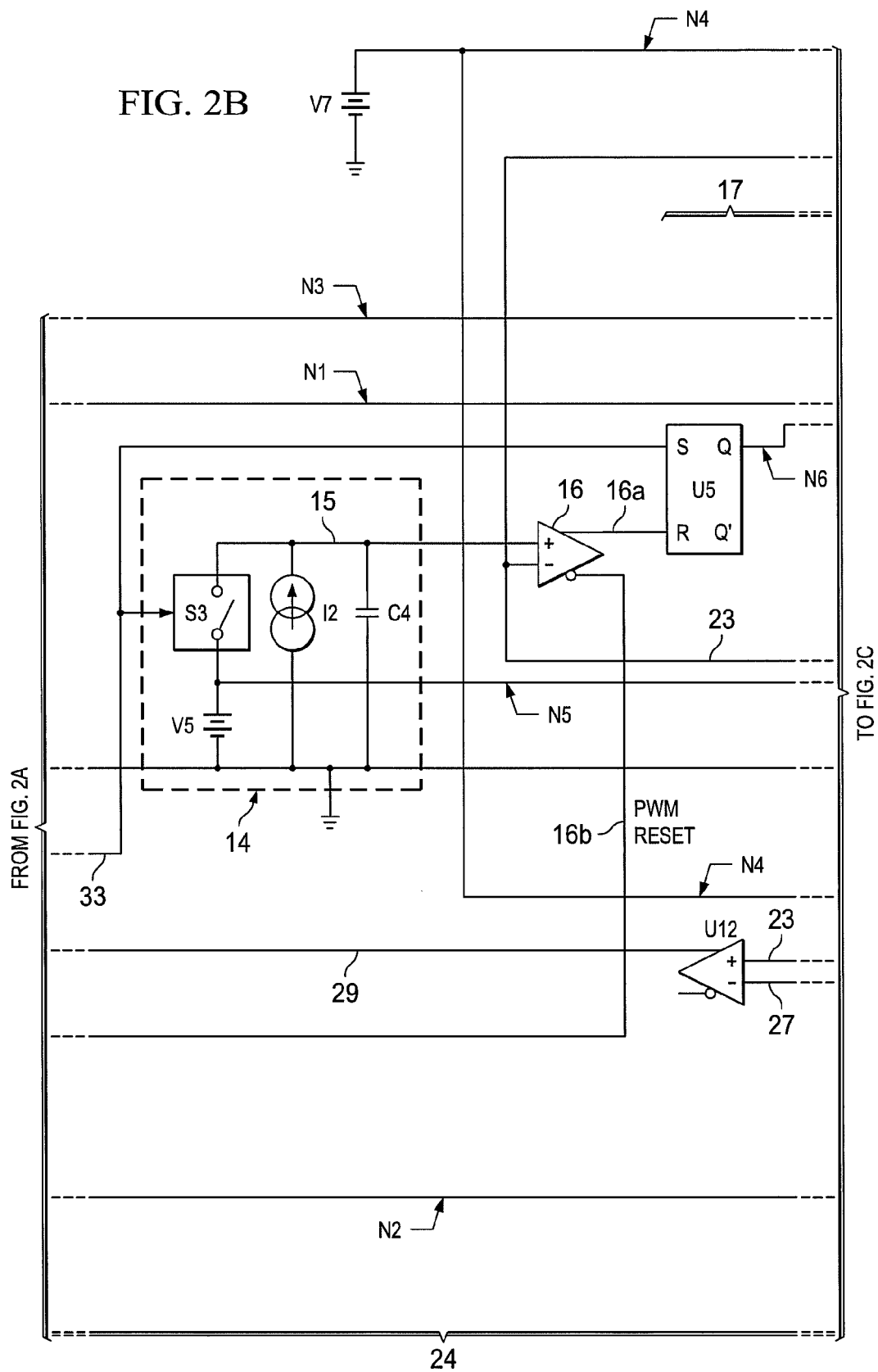
Figure 2C:
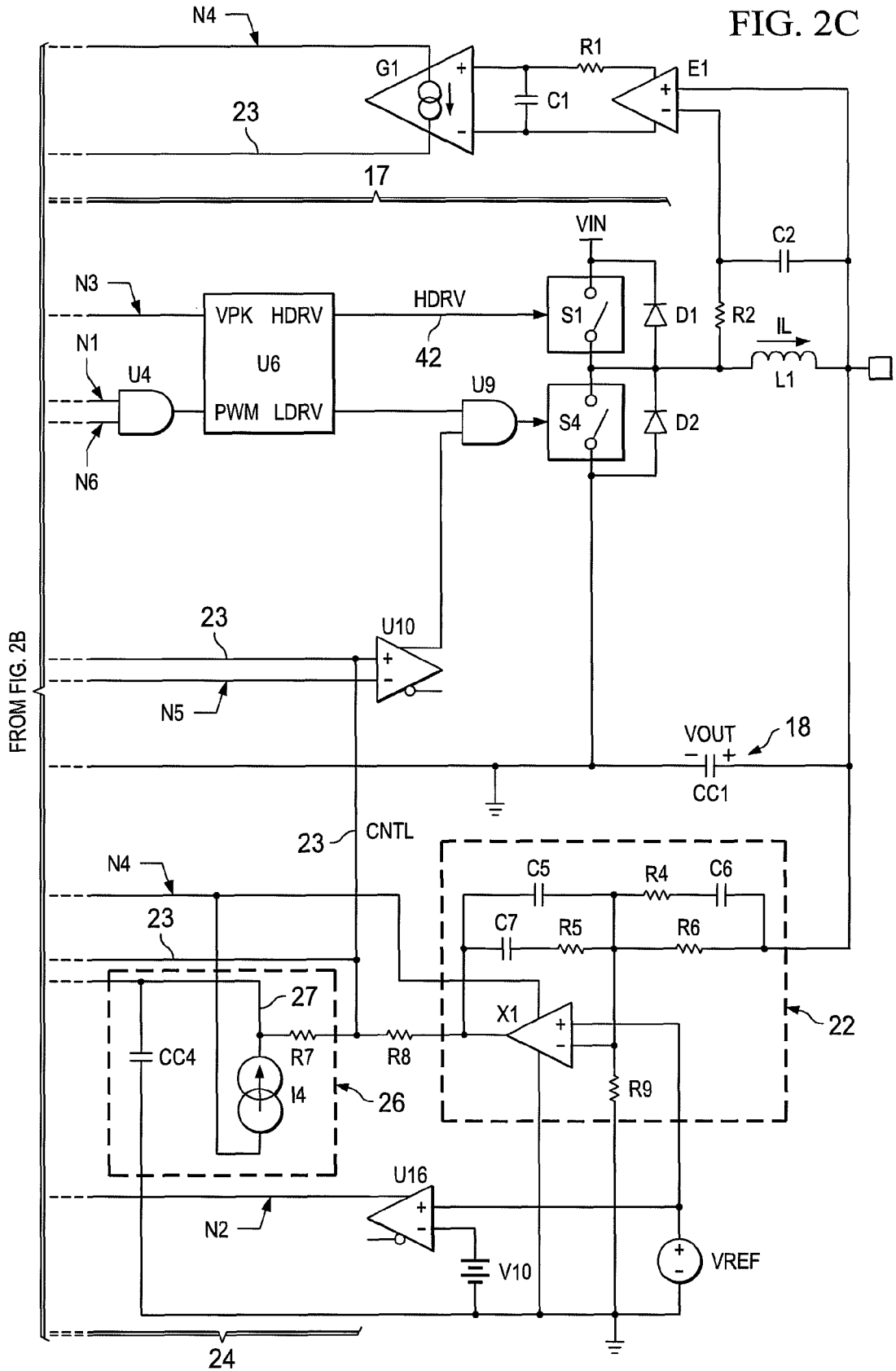

As seen in FIGS. 2A-2C, an oscillator circuit 12 is illustrated, which may be incorporated into the control circuit 10, or a clock signal 32 may be provided from an external source. For example, an integrated circuit implementation is possible including an on-board oscillator circuit 12, or such integrated circuit may include a pin for receipt of the clock signal 32. As shown, the oscillator circuit 12 includes a capacitor C3 with a first or lower terminal connected to a voltage source V3, and a second or upper terminal connected to a current source I3 at node N3. A switch S2 is connected in parallel across the capacitor C3 and is operated according to a switching control signal to be in either an open (high impedance) state allowing the current source I3 to charge the capacitor C3 or a closed (low impedance) state to discharge the capacitor C3. When discharged, the upper terminal of the capacitor C3 will be at a voltage approximately equal to the voltage source V3, and opening the switch S2 allows the capacitor C3 to charge, thereby increasing the voltage at the upper capacitor terminal in a linear (e.g., ramp) fashion. The oscillator circuit 12 further includes comparators U1 and U3 as well as voltage sources V2 and V4 and a set/reset (S/R) flip-flop U2 connected as shown, with the non-inverting (+) input of U1 being connected to a voltage equal to the sum of V2 and V4, and the inverting (−) input of U3 being connected to a voltage V4. In addition, the upper terminal of capacitor C3 is connected to the inverting input of U1 and the non-inverting input of U3 to provide the increasing ramp capacitor voltage as an input thereto. As connected, the inverting output of U1 provides an input to a set (S) input of the flip-flop U2, and the flip-flop reset (R) input is connected to the inverting output of U3. The clock signal 32 (CLK) is provided by the data output "Q" of the flip-flop U2, and the signal 32 is also provided as the switch control signal to switch S2, whereby the circuit 12 oscillates at a fixed frequency dictated by the capacitance of C3, the current provided by I3, and the relative voltages V2-V4. In addition, the complementary output "Q'" of the flip-flop U2 is provided to the driver circuit 17 at node N1 as described further below.

The control circuit 10 in FIGS. 2A-2C further includes an analog carrier waveform generator circuit 14 which provides a periodic carrier signal waveform 15 according to the clock input signal 32. In the illustrated implementation, the waveform generator circuit 14 includes a capacitor C4 connected in parallel with a current source I2, and the capacitor C4 is also connected in parallel with a series combination of a switch S3 and a voltage source V5. In operation, the current source I2 charges the capacitor C4 while the switch S3 is open, whereby the voltage of the carrier signal waveform 15 is a generally linearly increasing or rising ramp voltage. Closure of the switch S3 discharges the capacitor C4 to the voltage V5, after which subsequent opening of the switch S3 starts a new cycle of the increasing ramp signal waveform 15. The switch S3 is operated by a reset control signal 33 provided by an OR gate U7 having a first input receiving the oscillator clock output signal 32 and a second input receiving an output signal 25 from a reset circuit 28 for asynchronous injection of one or more pulses into the PWM output stream as described further below. In addition, independent of any assertion of the signal 25 from the reset circuit 28, the periodic restarting or resetting of the carrier waveform generator circuit output ramp waveform 15 is controlled by the clock signal 32.

The periodic carrier signal waveform 15 is provided as a voltage signal to the non-inverting input (+) of the PWM comparator circuit 16, and the comparator 16 receives the output error control signal 23 at an inverting input (−). The comparator 16 has a non-inverting output providing a pulse output signal 16a to a reset (R) input of a driver circuit flip-flop U5, whose set (S) input is connected to receive the reset signal 33 from the OR gate U7 as shown. The data (Q) output of the driver circuit flip-flop U5 provides a first input to an AND gate U4 via node N6, and the complementary data output (Q') of the oscillator circuit flip-flop U2 is connected as the second input to the gate U4. The output of U4 provides a PWM input to a driver circuit U6, and the ramp voltage across C3 of the oscillator circuit 12 provides a peak voltage input to the driver U6. The driver circuit U6 includes suitable signal conditioning circuitry as is known for creating complementary high and low switch driver output signals including a high drive output signal 42 (HDRV) and a complementary low drive output signal LDRV.

In operation, the driver circuit 17 provides the switching control signal 42 to operate a corresponding DC to DC converter switching device Si for selective conversion of power from a DC input VIN to provide DC output power to drive the load (load 20 in FIG. 1) in whole or in part according to the pulse output signal 16a from the comparator 16. In the illustrated buck converter configuration, moreover, a low side driver switch S4 is connected between the lower terminal of S1 and a circuit ground node, with fly back diodes D1 and D2 connected in parallel with the switches S1 and S4, respectively. In addition, the converter output is provided via an output inductor L1 for conduction of an inductor current IL, with an output filter 18 including a capacitor CC1 being connected between the output terminal and the circuit ground node, where the output voltage VOUT appears across the output capacitor CC1. In the illustrated embodiment, moreover, the low side driver switch S4 is driven by the output of an AND gate U9 having a first input receiving the LDRV signal from the driver U6 and a second input provided by a comparator U10. The comparator U10 compares the output error control signal 23 to the voltage value V5 at node N5 and selectively allows the low drive signal to operate the switch S4 when the control signal 23 exceeds V5. In operation, therefore, U10 turns OFF the synchronous rectifier when the output is above the regulation voltage to facilitate reduced output voltage overshoot during an abrupt load decrease.

The control circuit 10 further includes optional current mode control components, including an RC network with a resistor R2 and a capacitor C2 connected to provide a low pass filter for measurement of the voltage across the inductor L1 to provide a differential signal to an amplifier E1. The amplifier E1, in turn, provides a differential output voltage through another RC filter circuit including resistor R1 and capacitor C1 as an input to a transconductance amplifier G1. The transconductance amplifier G1 is powered from a voltage source V7 via node N4, and provides an offset current output connected to the output error control signal 23 at the inverting input of the comparison circuit 16. In this embodiment, therefore, the control circuit 10 can be operated in a current mode in which the error signal is offset according to the average inductor current IL, although other embodiments are possible in which the transconductance amplifier output current is not used to offset the control signal 23 for voltage mode operation. In another possible implementation, the offset current output of G1 could be used to provide an offset to the non-inverting input to the PWM comparator 16 (instead of the inverting input as shown). In other possible embodiments, the current measurement and offsetting components R1, R2, C1, C2, E1 and G1 can be omitted, with the circuit 10 operating in voltage mode according to the voltage error feedback control signal 23.

As seen in FIGS. 2A-2C, moreover, the DC to DC converter control circuit 10 includes an error amplifier circuit 22 which provides the output error control signal 23 to the comparison circuit 16 representing an output voltage error. In particular, the output terminal provides a voltage VOUT across the output capacitor CC1, and the output voltage signal is provided as an input to the error amplifier circuit 22 at a junction of a resistor R6 and a capacitor C6. C6 and a second resistor R4 are connected in parallel across the resistor R6 to provide an input to an inverting input (−) of an operational amplifier (op amp) X1, which is connected through a divider resistor R9 to the circuit ground. The resistors R6 and R9 form a resistive voltage divider circuit to create the inverting input to X1, and the non-inverting (+) input to X1 is connected to a reference voltage VREF. In practice, the reference voltage VREF can be a fixed voltage source in the circuit 10, or the reference voltage signal may be provided as a setpoint input for regulation of the DC to DC converter, for example, from another circuit or other suitable source (not shown). The error amplifier 22 further includes a feedback network with feedback capacitors C5 connected between the inverting input and the output of the amplifier X1, as well as a resistor R5 and another feedback capacitor C7 connected in series with one another in parallel with C5 as shown.

In accordance with one or more aspects of the present disclosure, moreover, the control circuit 10 includes a pulse injection circuit, referred to herein as an asynchronous pulse injection (API) circuit 24, which is coupled with the error amplifier 22 to receive the output error control signal 23. In operation, the API circuit 24 detects an output load current transient condition indicating an increased output load current according to the output error control signal 23. The pulse injection circuit 24 operates to selectively provide at least one signal 25 to cause the comparison circuit 16 to asynchronously inject at least one pulse into the pulse output signal 16a in response to detection of the output load current transient condition. The API circuit embodiment 24 in FIGS. 2A-2C is connected through a resistor R8 to the output of the error amplifier 22 to receive the output error control signal 23 (CNTL). In general, the circuit 24 operates to cause the comparison circuit 16 to asynchronously inject at least one pulse into the pulse output signal 16a in response to detection of an output load current transient condition indicating an unregulated drop in the output voltage VOUT, thus representing an increase in the output load current requirement.

As seen in FIGS. 2A-2C, the API circuit 24 includes an offset circuit 26 which creates an offset signal 27 by adding an offset voltage to the output error control signal 23. In the embodiment of FIGS. 2A-2C, the offset circuit 26 provides the offset signal 27 to represent an average of the output error control signal 23, offset or shifted by the offset voltage amount. In the illustrated implementation, for example, the offsetting effectively raises the voltage of the offset signal 27 relative to that of the original output error control signal 23, in order to provide a tolerance band to prevent false triggering of the asynchronous pulse injection, such that the output voltage VOUT can be regulated using the periodic PWM pulses in the signal stream 16a including a certain expected amount of ripple voltage. The API circuit 24 responds when the voltage drops below this normal expected regulation range to introduce one or more asynchronous pulses into the signal 16a. Moreover, the offset circuit embodiment 26 of FIGS. 2A-2C provides low pass filtering or averaging such that the offset signal 27 represents the average of the control signal 23, shifted by the offset voltage amount. The circuit 26 in this case includes a resistor R7 to receive the output error control signal 23, which is connected between R8 and an inverting input (−) of a second comparator U12, as well as a capacitor CC4 connected between the inverting input and the circuit ground, whereby resistor R7 and capacitor CC4 create an RC low pass filter circuit to present the offset signal 27 as the inverting input based on the average of the control signal 23, where the values of R7 and CC4 are set to provide a cutoff frequency below the expected output voltage ripple frequency (e.g., below the frequency of the clock signal 32). In addition, the offset circuit 26 includes an offset current source 14 injecting current into the inverting input of U12, where the amount of injected offset current from 14 is preferably set to increase the voltage at the inverting input by an amount greater than the expected ripple voltage of the control signal 23 to avoid false triggering of the API circuit 24. In this manner, the offset signal 27 provided to the inverting input of U12 represents the average of the output error control signal 23, offset or shifted by the offset voltage amount. The offset voltage amount is preferably greater than the peak to peak ripple voltage on the control signal 23 plus some margin, but also preferably low enough to allow for a small delay from the time the signal 23 begins to move to the time U12 outputs a "high" signal in order to dominate the latency of the circuit 10.

The non-inverting (+) input of the API circuit comparator U12 is connected to receive the output error control signal 23, and the output of U12 provides a binary comparator voltage output signal 29 at a first voltage level (low) indicating regulated operation when the offset signal 27 exceeds the present value of the output error control signal 23, and at a second voltage level (high) when the output error control signal 23 is greater than the offset signal 27 indicating an unregulated drop in the output voltage.

The API circuit 24 in this example also includes a reset circuit 28 which provides an output signal 25 to selectively restart the periodic carrier signal waveform 15 via a reset OR gate U7 to cause the comparator 16 to generate an asynchronous pulse in response to the comparator voltage output signal 29 from the API comparator U12 transitioning from the first voltage level to the second voltage level. The illustrated reset circuit 28 includes a flip-flop U11 receiving the binary comparator voltage output signal 29 at a set (S) input, and receiving a PWM reset signal 16b from the PWM comparator 16 at a reset (R) input. The flip-flop U11 provides an output signal 25 from the data output "Q" through an AND gate U14 to U7 in order to cause the comparison circuit 16 to asynchronously inject one or more pulses into the pulse output signal 16a in response to the binary comparator voltage output signal 29 transitioning from the first voltage level to the second voltage level (e.g., when the output voltage dips below the normal regulation range in response to an increased output current demand).

The PWM comparison circuit 16 includes an inverting second output providing the PWM reset pulse output signal 16b complementary to the primary PWM pulse output signal 16a, which allows the reset circuit 28 to potentially inject more than one asynchronous pulse into the pulse stream 16a between clock pulses, if needed to address a detected output voltage dip. In this example, moreover, the AND gate U14 receives the voltage input V8, and the output of a buffer amplifier U15 receiving the output at node N2 from a comparator U16 comparing the reference voltage (setpoint) input VREF to a voltage source V10. In operation, U15 effectively deactivates the API circuit 24 during startup and delays initialization until the reset signal 27 (average) has stabilized.

Referring also to FIGS. 3 and 4, FIG. 3 illustrates various waveforms in the control circuit embodiment 10 of FIG. 2, including a graph 30 showing the clock signal pulses 32 and a graph 40 showing the high drive PWM signal pulses 42 associated with the clock pulses 32, as well as examples of asynchronously inserted pulses 25a and 25b initiated by the API circuit 24 asserting the output signal 25 to reset the waveform generator 14. As seen in FIGS. 2A-2C, the OR gate U7 allows either the clock signal 32 or the API output signal 25 to restart the ramp generator circuit 14, thereby initiating the beginning of a PWM pulse. In the example of FIG. 3, moreover, a graph 50 illustrates the output load current requirement 52 (ILOAD) for the DC to DC converter, which undergoes an exemplary fast transient increase as shown.

The graph 60 in FIG. 3 further illustrates the periodic carrier signal waveform 15 that provides an increasing ramp (sawtooth) waveform for which each cycle begins in response to a negative edge of the clock signal 32 (e.g., by operation of the switch S3 in the waveform generator circuit 14 of FIG. 2). Graph 70 in FIG. 3 further illustrates the output error control signal 23 along with the offset signal 27, where the transition of the control signal 23 above the offset signal 27 causes the output of U12 to transition from low to high, thereby triggering the flip-flop U11 to generate the reset circuit output signal 25 to begin a new cycle of the ramp signal 15 (graph 60), resulting in creation of the inserted asynchronous pulse 25a (graph 40). At the next negative edge of the clock signal 32, the OR gate U7 initiates another reset signal 33 to again restart the ramp waveform to create the next scheduled (periodic) PWM pulse 42 (graph 40). The width of this periodic pulse 42, moreover, is greater than that of the preceding periodic pulse 42, since the control error signal 23 is now at a higher level due to the output voltage dropping below the normal regulation range (e.g., the voltage error is increased). After the periodic pulse 42, the control signal 23 in this example remains above the offset signal 27 (e.g., due to a large increase in the output load current demand 52 (graph 50)), and thus the API circuit 24 again asserts the signal 25 to initiate another reset signal 33, resulting in another restart to the ramp signal 15 (graph 60), causing the comparator circuit 16 to insert a further asynchronous pulse 25b (graph 40) into the high drive PWM pulse stream.

A graph 80 in FIG. 3 shows the corresponding output voltage signal 82 (VOUT) which initially dips as a result of the increased output current load transition 52 (graph 50). As seen in the graph 80, moreover, the voltage output curve 82 then recovers fairly quickly as a result of the asynchronously injected pulses 25a and 25b in addition to the intervening regularly scheduled pulse 42. In this regard, the additional pulses 25a and 25b serve to replenish the energy in the output inductor L1 (FIGS. 2A-2C), thereby minimizing or in any event reducing the amount of output voltage dip during the transient. The graph 80 further illustrates a corresponding output voltage curve 84 showing operation of the PWM controller 10 without use of the API circuit 24, wherein the voltage output 84 drops significantly following the increasing load current transition 52. Moreover, the response of the control circuit 10 without the asynchronous pulse injection aspects of the present disclosure results in a larger voltage amplitude drop 84, as well as a longer response time (e.g., several cycles of the clock signal 32 in this example). Also, the graph 80 in FIG. 3 illustrates the output voltage curve 84 undergoing an overshoot condition (indicated at 86), which overshoot result is avoided or mitigated by use of the API circuit 24 as seen in the curve 82. FIG. 3 further illustrates a graph 90 showing the output inductor current 92 (IL) which generally increases periodically in response to the regularly scheduled PWM pulses 42, and then provides increased levels in response to the asynchronous pulses 25a and 25b as shown, whereby the average inductor current value generally tracks the load requirement transient 52 (ILOAD in graph 50). The graph 90 further illustrates a curve 94 showing the inductor current for the case in which no API circuit 24 is used, wherein it is seen that the current 94 follows a lower trajectory immediately following the output load transient increase 52, and results in higher output current for the following several clock cycles 32, whereby it is seen that the graph 92 involving use of the API circuit 24 successfully mitigates or avoids output current ringing or oscillation or overshoot compared with the approach in which no asynchronous pulses are injected.

FIG. 4 further illustrates operation of the circuit 10 with and without use of the API circuit 24. The graph 100 in FIG. 4 shows the output load current requirement curve 52 for a longer time interval then was shown in the graph 50 of FIG. 3, undergoing an initial increase, followed by a subsequent decrease. The graph 110 in FIG. 4 shows the output voltage curve 82 (similar to that of graph 80 in FIG. 3), in which the output voltage dip following the load current requirement transition has a magnitude 112, and the output voltage curve 82 resumes normal regulation fairly quickly with no overshoot. The graph 120 shows the output voltage curve 84 where no API pulses are injected into the PWM pulse stream 16a (similar to that of graph 80 in FIG. 3) which exhibits a voltage dip magnitude 122 greater than the magnitude 112 experienced when one or more API pulses are injected. In addition, as seen in FIG. 4, the output voltage undergoes a significant overshoot condition at 86, which is not seen in the curve 82 of the graph 110.

The asynchronous pulse injection circuitry 24 thus advantageously operates to improve the load transient response of the fixed frequency trailing-edge PWM DC to DC converter, and may also be implemented in leading-edge PWM configurations. Moreover, as discussed above, the API circuitry 24 can be employed in fixed frequency PWM DC to DC conversion applications implemented for a current mode control architecture. In certain examples, for instance, the saw-tooth ramp signal 15 can be used as a slope compensation signal, and the control signal 23 is again used as the inverting input to the comparator 16.

Figure 5A:
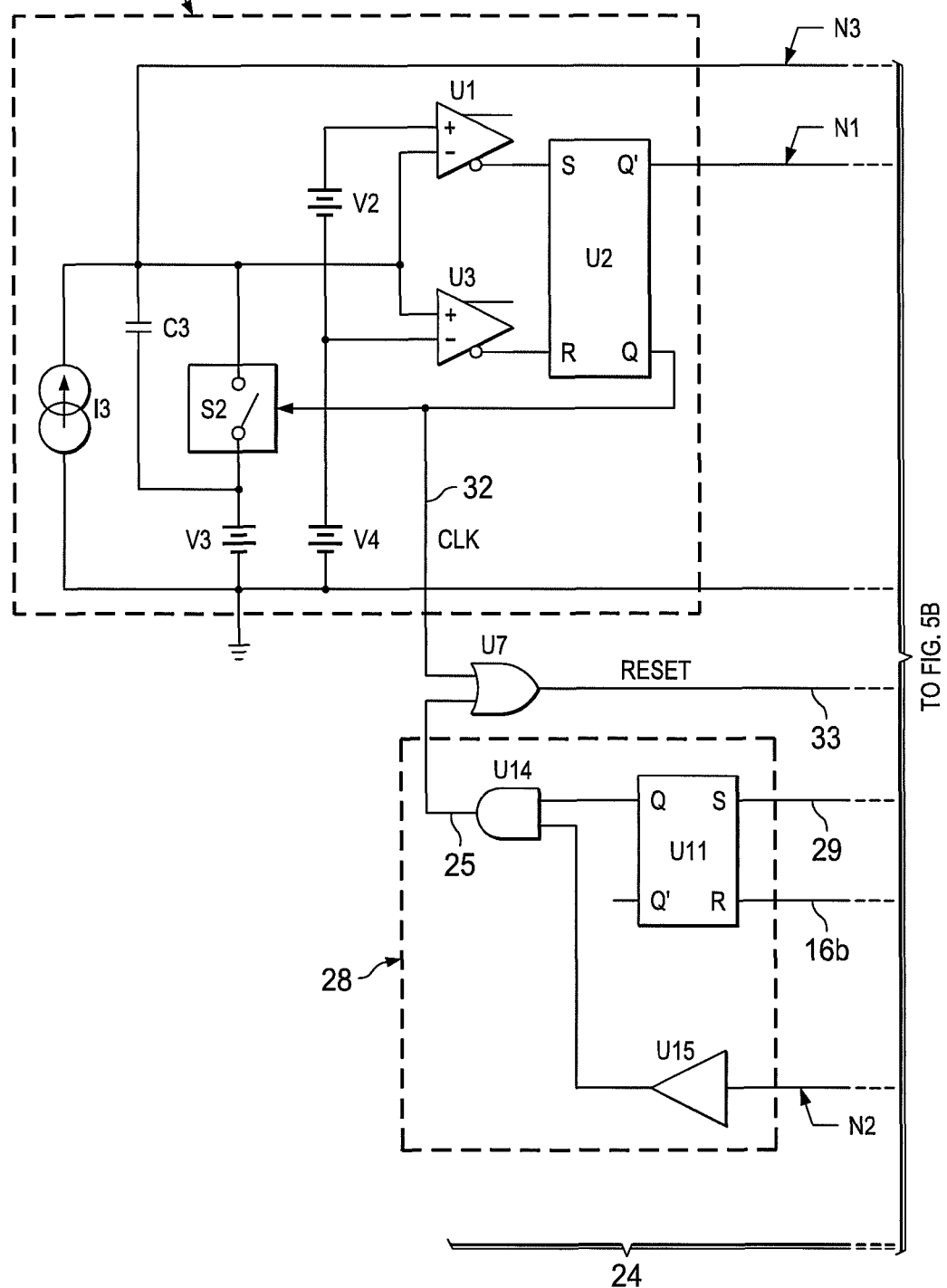
Figure 5C:
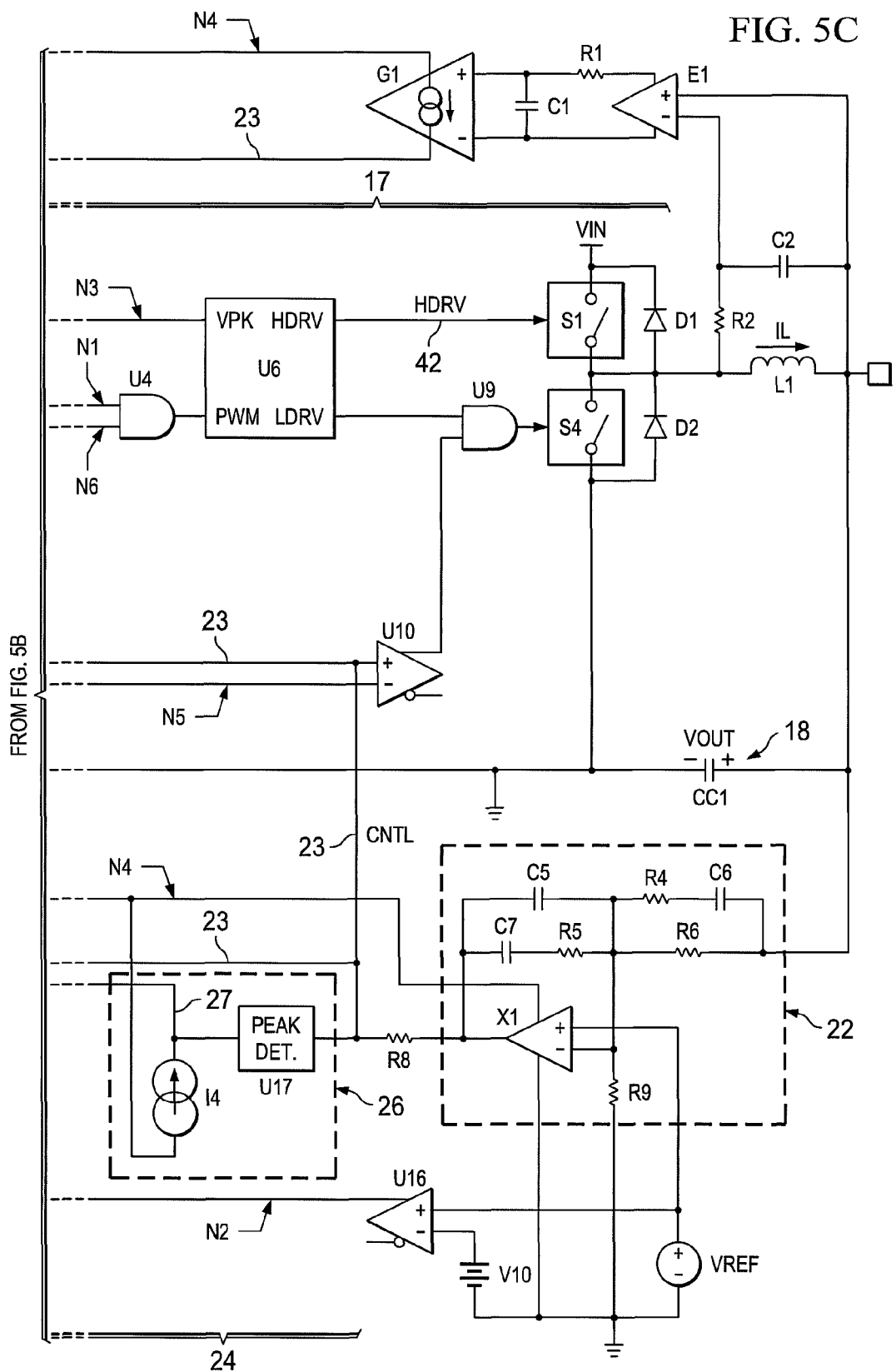

FIGS. 5A-5C illustrate another circuit embodiment 10 generally as described above in connection with FIGS. 2A-2C. In this example, however, the offset circuit 26 includes a peak detector circuit U17 with an input connected to receive the output error control signal 23, as well as an output connected to provide a peak voltage signal representing the peak of the output error control signal 23 as the second (inverting) input of the comparator U12. In addition, the offset circuit 26 includes the offset current source 14 which provides an offset current to increase the voltage at the inverting input of U12. In this manner, the offset circuit 27 provides the offset signal 27 to the comparator U12 to represent the peak voltage of the output error control signal 23 offset or shifted up by the offset voltage amount. As in the above described implementations, the offset signal 27 in FIGS. 5A-5C is compared by the comparator U12 with the unmodified control signal 23 for selectively detecting upward load current transient conditions and corresponding triggering of asynchronous pulse injection into the pulse stream 16a as described above. Any suitable peak and hold circuit U17 can be used which quantifies the peak output of the input signal for subsequent offsetting using the current source 14.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A DC to DC converter control circuit, comprising:
an analog carrier waveform generator circuit providing a periodic carrier signal waveform according to a clock input signal;
a comparison circuit, including a first input receiving the periodic carrier signal waveform, a second input receiving an output error control signal, and an output providing a pulse output signal including a plurality of pulses individually corresponding to clock pulses of the clock input signal and having corresponding pulse widths varying at least partially according to the periodic carrier signal waveform and the output error control signal;
a driver circuit providing at least one switching control signal to operate a corresponding switching device to selectively convert power from a DC input to provide DC output power to a load at least partially according to the pulse output signal from the comparison circuit;
an error amplifier, including a first input receiving a feedback voltage signal representing an output voltage provided to the load, a second input receiving a reference voltage signal representing a desired output voltage, and an output providing the output error control signal to the comparison circuit representing an output voltage error at least partially according to the feedback voltage signal and the reference voltage signal; and
an asynchronous pulse injection circuit operative to cause the comparison circuit to asynchronously inject at least one pulse into the pulse output signal in response to detection of an output load current transient condition indicating an unregulated drop in the output voltage, the asynchronous pulse injection circuit comprising:
an offset circuit creating an offset signal by adding an offset voltage to the output error control signal from the error amplifier;
a comparator, including a first input receiving the output error control signal, a second input receiving the offset signal, and an output providing a binary comparator voltage output signal at a first voltage level when the offset signal is greater than the output error control signal and at a second voltage level when the output error control signal is greater than the offset signal indicating an unregulated drop in the output voltage; and
a reset circuit comprising a reset circuit flip-flop receiving the binary comparator voltage output signal and providing an output signal to cause the comparison circuit to asynchronously inject at least one pulse into the pulse output signal in response to the binary comparator voltage output signal transitioning from the first voltage level to the second voltage level,
wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal.

2. The control circuit of claim 1, wherein the offset circuit comprises:
a resistor with a first terminal connected to receive the output error control signal and a second terminal connected to the second input of the comparator;
a capacitor connected between the second input of the comparator and a circuit ground node; and
an offset current source providing an offset current to increase a voltage at the second input of the comparator;
wherein the resistor and the capacitor provide a low pass filter, and wherein the offset circuit provides the offset signal to the second input of the comparator to represent an average of the output error control signal offset by the offset voltage.

3. The control circuit of claim 2:
wherein the analog carrier waveform generator circuit comprises:
a capacitance connected between the first input of the comparison circuit and the circuit ground node to provide a capacitor voltage to the first input of the comparison circuit,
a current source providing current flow to the first input of the comparison circuit, and
a switch connected between the first input of the comparison circuit and a constant voltage node, the switch operable according to a reset control signal in a first state to allow the current flow from the current source to charge the capacitance to provide the carrier signal waveform as an increasing ramp signal waveform, and in a second state to at least partially discharge the capacitance to reset the capacitor voltage to approximately the voltage of the constant voltage node;

wherein the clock signal is provided to place the switch in the second state to cause the comparison circuit to periodically reset the capacitor voltage to approximately the voltage of the constant voltage node to provide a periodic increasing ramp signal waveform to the first input of the comparison circuit to cause the comparison circuit to provide the pulse output signal including a plurality of pulses individually corresponding to clock pulses of the clock input signal and having corresponding pulse widths varying at least partially according to the periodic carrier signal waveform and the output error control signal; and wherein the reset circuit flip-flop provides the output signal to place the switch in the second state to reset the capacitor voltage to approximately the voltage of the constant voltage node to cause the comparison circuit to asynchronously inject a pulse into the pulse output signal in response to the binary comparator voltage output signal transitioning from the first voltage level to the second voltage level.

4. The control circuit of claim 3, further comprising an OR gate with a first input receiving the clock input signal, a second input receiving the output signal from the reset circuit flip-flop, and an output providing the reset control signal to the switch.

5. The control circuit of claim 4, wherein the driver circuit comprises:

a driver circuit flip-flop with a set input receiving the reset control signal from the output of the OR gate, a reset input connected to the output of the comparison circuit, and an output providing an output signal; and an AND gate with a first input receiving the output signal from the output of the driver circuit flip-flop receiving an input signal complementary to the clock input signal, a second input receiving the output signal from the output of the driver circuit flip-flop, and an output providing the at least one switching control signal.

6. The control circuit of claim 5, wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal.

7. The control circuit of claim 1, wherein the offset circuit comprises:

a peak detector circuit with an input connected to receive the output error control signal, and an output connected to provide a peak voltage signal representing a peak voltage of the output error control signal to the second input of the comparator; and an offset current source providing an offset current to increase a voltage at the second input of the comparator;

wherein the offset circuit provides the offset signal to the second input of the comparator to represent the peak voltage of the output error control signal offset by the offset voltage.

8. The control circuit of claim 7:

wherein the analog carrier waveform generator circuit comprises:

a capacitance connected between the first input of the comparison circuit and the circuit ground node to provide a capacitor voltage to the first input of the comparison circuit, a current source providing current flow to the first input of the comparison circuit, and a switch connected between the first input of the comparison circuit and a constant voltage node, the switch operable according to a reset control signal in a first state to allow the current flow from the current source to charge the capacitance to provide the carrier signal waveform as an increasing ramp signal waveform, and in a second state to at least partially discharge the capacitance to reset the capacitor voltage to approximately the voltage of the constant voltage node;

wherein the clock signal is provided to place the switch in the second state to cause the comparison circuit to periodically reset the capacitor voltage to approximately the voltage of the constant voltage node to provide a periodic increasing ramp signal waveform to the first input of the comparison circuit to cause the comparison circuit to provide the pulse output signal including a plurality of pulses individually corresponding to clock pulses of the clock input signal and having corresponding pulse widths varying at least partially according to the periodic carrier signal waveform and the output error control signal; and wherein the reset circuit flip-flop provides the output signal to place the switch in the second state to reset the capacitor voltage to approximately the voltage of the constant voltage node to cause the comparison circuit to asynchronously inject a pulse into the pulse output signal in response to the binary comparator voltage output signal transitioning from the first voltage level to the second voltage level.

9. The control circuit of claim 8, further comprising an OR gate with a first input receiving the clock input signal, a second input receiving the output signal from the reset circuit flip-flop, and an output providing the reset control signal to the switch.

10. The control circuit of claim 9, wherein the driver circuit comprises:

a driver circuit flip-flop with a set input receiving the reset control signal from the output of the OR gate, a reset input connected to the output of the comparison circuit, and an output providing an output signal; and an AND gate with a first input receiving the output signal from the output of the driver circuit flip-flop receiving an input signal complementary to the clock input signal, a second input receiving the output signal from the output of the driver circuit flip-flop, and an output providing the at least one switching control signal.

11. The control circuit of claim 10, wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal.

12. The control circuit of claim 7, wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal.

13. The control circuit of claim 1:
wherein the analog carrier waveform generator circuit comprises:
a capacitance connected between the first input of the comparison circuit and the circuit ground node to provide a capacitor voltage to the first input of the comparison circuit,
a current source providing current flow to the first input of the comparison circuit, and
a switch connected between the first input of the comparison circuit and a constant voltage node, the switch operable according to a reset control signal in a first state to allow the current flow from the current source to charge the capacitance to provide the carrier signal waveform as an increasing ramp signal waveform, and in a second state to at least partially discharge the capacitance to reset the capacitor voltage to approximately the voltage of the constant voltage node;
wherein the clock signal is provided to place the switch in the second state to cause the comparison circuit to periodically reset the capacitor voltage to approximately the voltage of the constant voltage node to provide a periodic increasing ramp signal waveform to the first input of the comparison circuit to cause the comparison circuit to provide the pulse output signal including a plurality of pulses individually corresponding to clock pulses of the clock input signal and having corresponding pulse widths varying at least partially according to the periodic carrier signal waveform and the output error control signal; and
wherein the reset circuit flip-flop provides the output signal to place the switch in the second state to reset the capacitor voltage to approximately the voltage of the constant voltage node to cause the comparison circuit to asynchronously inject a pulse into the pulse output signal in response to the binary comparator voltage output signal transitioning from the first voltage level to the second voltage level.

14. The control circuit of claim 13, further comprising an OR gate with a first input receiving the clock input signal, a second input receiving the output signal from the reset circuit flip-flop, and an output providing the reset control signal to the switch;
wherein the driver circuit comprises:
a driver circuit flip-flop with a set input receiving the reset control signal from the output of the OR gate, a reset input connected to the output of the comparison circuit, and an output providing an output signal; and
an AND gate with a first input receiving the output signal from the output of the driver circuit flip-flop receiving an input signal complementary to the clock input signal, a second input receiving the output signal from the output of the driver circuit flip-flop, and an output providing the at least one switching control signal.

15. The control circuit of claim 14, wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal.

16. A fixed frequency analog PWM controller for a DC to DC conversion system, comprising:
an analog carrier waveform generator circuit providing a periodic carrier signal waveform according to a clock input signal;
a comparison circuit providing a pulse output signal including a plurality of periodic pulses individually corresponding to clock pulses of the clock input signal and having corresponding pulse widths varying at least partially according to relative amplitudes of the periodic carrier signal waveform and the output error control signal, wherein the comparison circuit comprises a second output providing a PWM reset pulse output signal complementary to the pulse output signal, and wherein the reset circuit flip-flop comprises a set input receiving the binary comparator voltage output signal, a reset input receiving the PWM reset pulse output signal from the second output of the comparison circuit, and an output at least partially generating the output signal of the reset circuit to cause the comparison circuit to asynchronously inject the at least one pulse into the pulse output signal;
a driver circuit providing at least one switching control signal to operate at least one corresponding switching device to selectively convert power from a DC input to provide DC output power to a load at least partially according to the pulse output signal from the comparison circuit;
an error amplifier providing the output error control signal to the comparison circuit representing an output voltage error; and
a pulse injection circuit operatively coupled with the error amplifier to detect an output load current transient condition indicating an increased output load current according to the output error control signal, the pulse injection circuit operative to selectively provide at least one signal to cause the comparison circuit to asynchronously inject at least one pulse into the pulse output signal in response to detection of the output load current transient condition.

17. The PWM controller of claim 16:
wherein the analog carrier waveform generator circuit comprises a reset control input to control restarting of the periodic carrier signal waveform; and
wherein the pulse injection circuit comprises:
an offset circuit creating an offset signal representing an average or peak voltage of the output error control signal offset by an offset voltage amount;
a second comparator providing a comparator voltage output signal at a first voltage level when the offset signal is greater than the output error control signal and at a second voltage level when the output error control signal is greater than the offset signal indicating an increased output load current; and
a reset circuit providing an output signal to selectively restart the periodic carrier signal waveform to cause the comparator to generate an asynchronous pulse in response to the comparator voltage output signal transitioning from the first voltage level to the second voltage level.

18. An integrated circuit product, comprising:
a carrier-based analog pulse width modulation circuit, comprising:
a ramp generator providing a resettable ramp voltage waveform, and
a PWM comparator generating a fixed frequency PWM signal by comparing the resettable ramp voltage waveform with a modulating signal;
a reset circuit operative according to a periodic clock signal or to a reset input signal to reset the ramp generator; and
a transient detector circuit receiving an output voltage feedback signal representing an output voltage of a DC to DC converter controlled according to the fixed frequency PWM signal, and providing the reset input signal to the reset circuit independent from the periodic clock signal to reset the ramp generator and cause the PWM comparator to inject at least one asynchronous pulse into the fixed frequency PWM signal in respect to an output voltage dip detected according to the output voltage feedback signal, the feedback signal being compared with an offset signal to generate a comparator output signal, when the feedback signal from the error amplifier deviates from the average or peak value by the offset amount, the reset circuit starts a new cycle of the ramp signal in which the control signal will have a voltage amplitude that will control a width of the asynchronously injected pulse.

* * * * *